W. STILLWELL.
AUTOMATIC STREET CAR FENDER.
APPLICATION FILED JUNE 19, 1915.
1,177,214.
Patented Mar. 28, 1916.
3 SHEETS—SHEET 3.
Fig. 3.
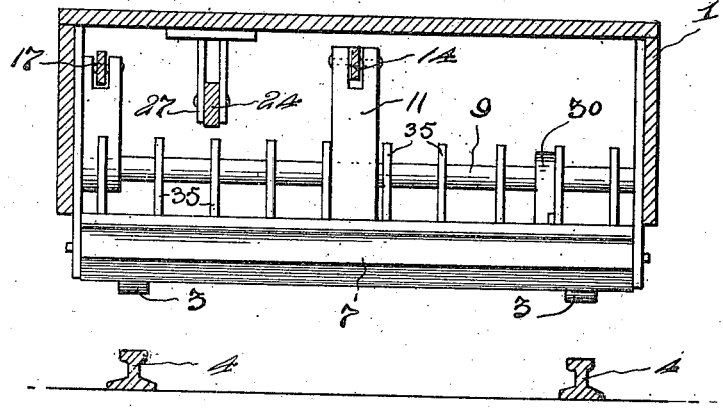
Fig. 4.
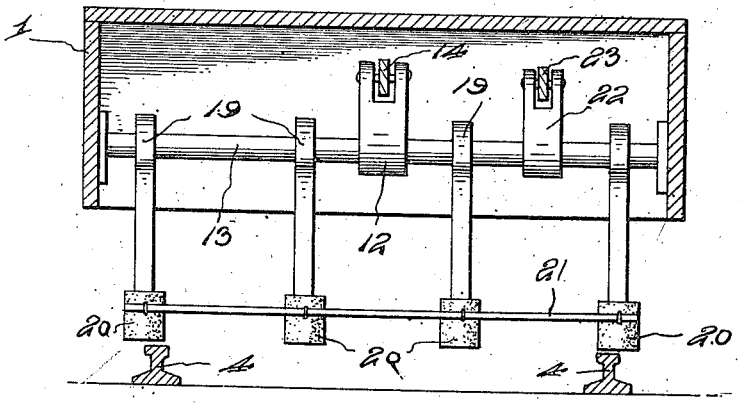
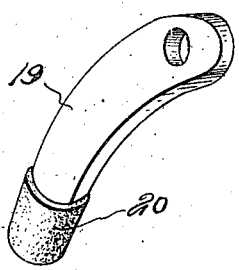
Fig. 5.
Witnesses
Inventor
W. Stillwell.
By
Attorney

UNITED STATES PATENT OFFICE.

WILLIAM STILLWELL, OF PORTSMOUTH, OHIO.

AUTOMATIC STREET-CAR FENDER.

1,177,214. Specification of Letters Patent. Patented Mar. 28, 1916.

Application filed June 19, 1915. Serial No. 35,119.

*To all whom it may concern:*

Be it known that I, WILLIAM STILLWELL, a citizen of the United States, residing at Portsmouth, in the county of Scioto and State of Ohio, have invented certain new and useful Improvements in Automatic Street-Car Fenders; and I do hereby declare the following to be a full, clear, and exact description of the invention, such as will enable others skilled in the art to which it appertains to make and use the same.

The invention relates to improvements in street car fenders.

The object of the present invention is to improve the construction of street car fenders and to provide a simple, practical, and comparatively inexpensive street car fender designed particularly for use in connection with electric cars and adapted to be manually operated by a motorman and capable also of automatic operation through contact with an object to prevent a person or other object from being run over by a car.

A further object of the invention is to provide an automatic street car fender of this character adapted when operated either manually or automatically to cut off the power of the car and simultaneously apply the brakes so that the car will be brought to a sudden stop by the simple operation of the fender.

With these and other objects in view the invention consists in the construction and novel combination and arrangement of parts hereinafter fully described, illustrated in the accompanying drawings and pointed out in the claims hereto appended, it being understood that various changes in the form, proportion and minor details of construction may be resorted to without departing from the spirit or sacrificing any of the advantages of the invention.

Figure 1:
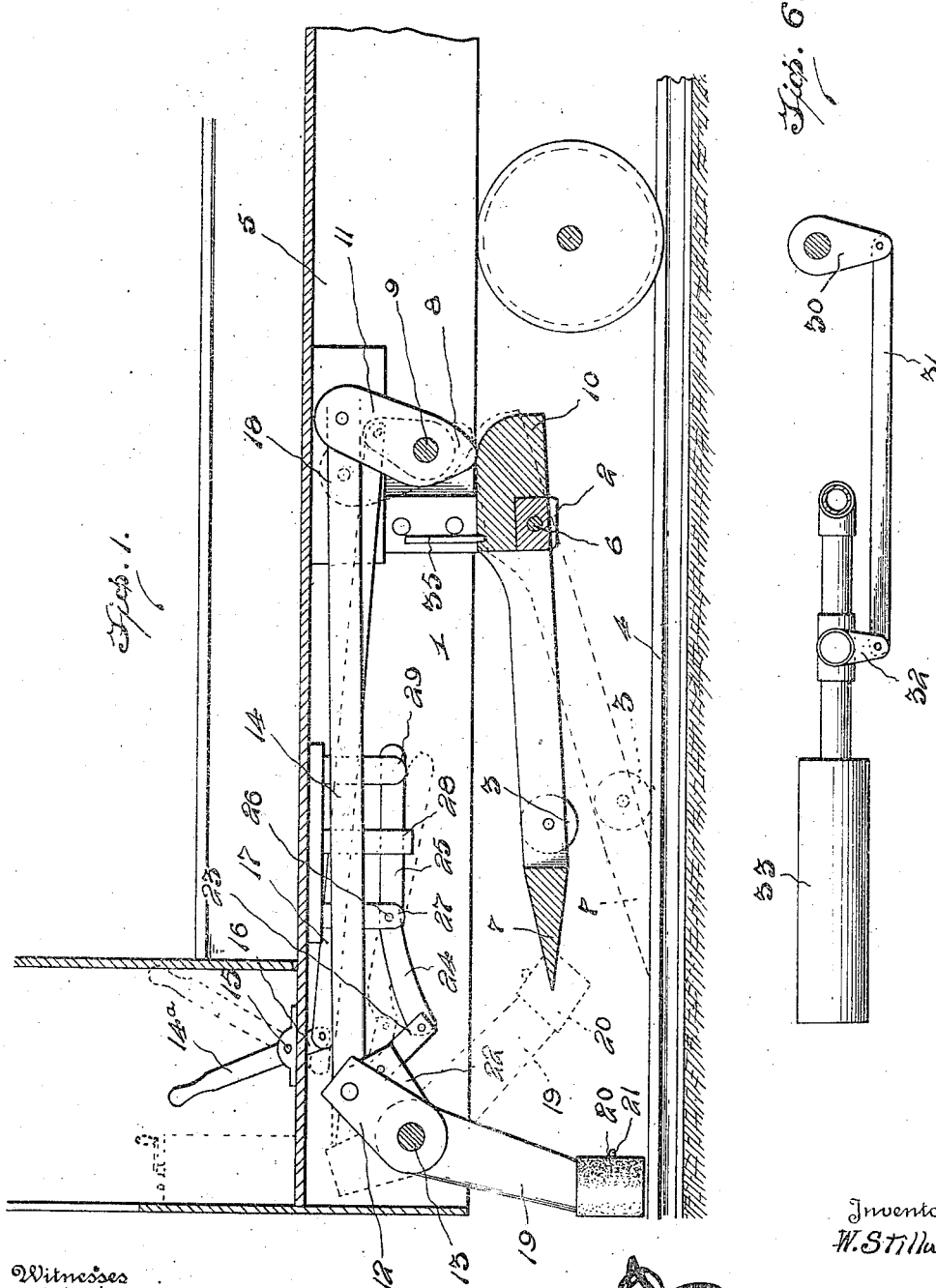
Figure 2:
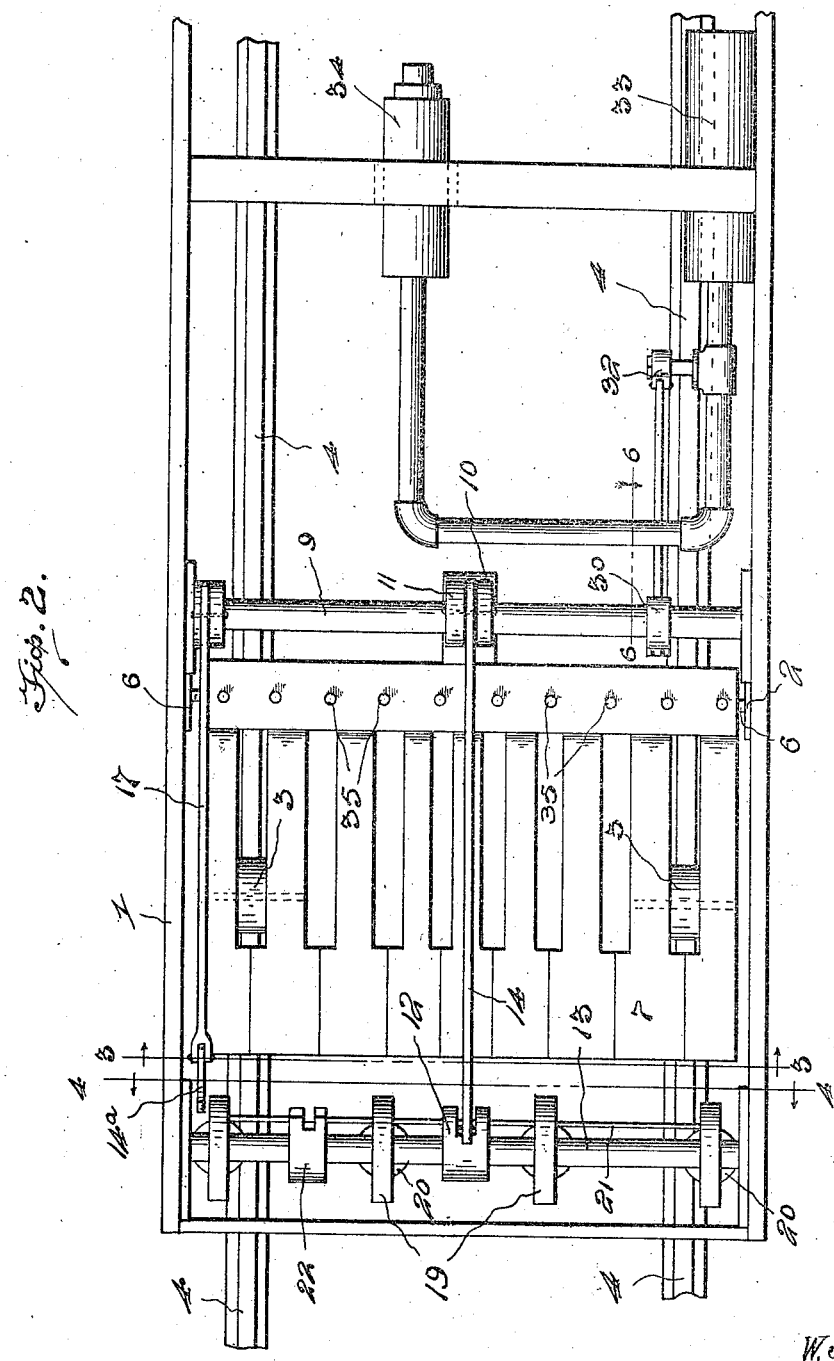

In the drawings Figure 1 is a longitudinal sectional view of a portion of a car provided with an automatic car fender constructed in accordance with this invention, Fig. 2 is a plan view of the same, Fig. 3 is a transverse sectional view on the line 3—3 of Fig. 2, Fig. 4 is a transverse sectional view on the line 4—4 of Fig. 2, Fig. 5 is a detail perspective view of one of the trip arms, Fig. 6 is a detail sectional view on the line 6—6 of Fig. 2.

Like numerals of reference designate corresponding parts in all the figures of the drawings.

In the accompanying drawing in which is illustrated the preferred embodiment of the invention, 1 designates a fender constructed of suitable material and pivotally mounted at its rear portion in suitable bearing brackets 2 and provided at its front portion with small wheels 3 adapted to run upon the track 4 to support the fender 1 in an inclined position when the latter is lowered for picking up a person. The bearing brackets 2 are suitably secured to the car 5 at opposite sides thereof and the pivot 6 may be of any desired construction. The fender has a beveled or tapered front end or portion 7 to enable it to fit flat against the rails and to prevent all liability of a person accidentally getting beneath the fender and throwing the same upwardly and being run over by the car. The fender is supported in an elevated position as illustrated in full lines in Fig. 1 of the drawing by means of a rounded arm or cam 8 carried by a rear transverse rock shaft 9 and arranged to engage a rearwardly projecting arm 10 extending from the back of the fender at the center thereof. The arm 10 is rounded at its upper rear corner and the cam 8 is preferably formed by the lower depending portion of an arm 11, which is suitably fixed to and extends upwardly from the rear rock shaft 9. The arm 11 of the rear rock shaft 9 is connected with an arm 12 of a front rock shaft 13 by a longitudinal bar 14 and it is adapted to be oscillated to rock the rear rock shaft to carry the cam into and out of engagement with the rear arm 10 of the fender. When the cam or engaging portion of the rear rock shaft is swung rearwardly out of engagement with the arm 10 of the fender the latter is permitted to drop to the dotted line position illustrated in Fig. 1 of the drawings.

The rear rock shaft is partially rotated by hand to drop the fender by means of an operating lever 14$^a$ pivotally mounted on the car at 15 at a point near its lower end and having a depending arm 16 which is connected by a rod or bar 17 with an arm 18 extending upwardly from the rear rock shaft. The operating lever 14 is designed to be located at the platform of the car adjacent to the controller within easy reach of the locomotive so that the fender may be easily and quickly dropped should the motorman see an object on the track.

In order to provide for an automatic operation of the fender in event of the failure of a motorman to operate the same, the front rock shaft 13 is provided with a plurality of depending trip arms 19 suitably secured at their upper ends to the front rock shaft 13 and provided at their lower ends with bumpers 20 preferably consisting of rubber caps fitted on the said arms 19 and adapted to contact with a person or other object. Any number of the trip arms may be provided and they are preferably connected by a transversely disposed flexible connection 21 which extends across the spaces or intervals between the trip arms and any number of the flexible connections may of course be employed. When the trip arms come in contact with a person or other object they are swung rearwardly and upwardly to the dotted line position illustrated in Fig. 1 of the drawings and the front rock shaft is partially rotated and operates to swing the depending cam portion 8 of the arm 11 out of engagement with the rearwardly extending arm of the fender to permit the latter to fall through the track.

The front and rear rock shafts are journaled in suitable bearings of the car and the front rock shaft is provided with an arm 22 which is connected by a link 23 with one arm 24 of a switch lever 25 pivoted intermediate of its ends at 26 to a suitable post or bracket 27 and coöperating with spaced contacts 28 and 29. The switch may be of any desired construction and the switch lever 25 which is suitably insulated from the bracket 27 and the link 23 is movable into and out of contact with the contact 29 and when the front rock shaft is operated it is swung downwardly to the dotted line position shown in Fig. 1. This breaks the circuit and cuts off the current from the motor. Simultaneously with this operation the brakes of the car are applied by the rear rock shaft 9 which is provided with an arm 30 connected by a rod or bar 31 with a brake valve 32 which is adapted to permit the pressure of an air tank 33 to flow into a brake cylinder or brake operating cylinder 34. The fender is adapted to operate a valve of any desired character for applying the brakes simultaneously with the cutting off of the current from the motor so that the car will be quickly stopped when the fender is operated, either manually or automatically.

The fender is equipped at the back with a guard 35 preferably consisting of a series of rods extending upwardly from the fender and adapted to prevent a person or other object from falling over the back of the fender and getting under the car. The rear guard, may, however, be constructed in any other desired manner, and when the fender extends downwardly and forwardly in an inclined position the guard is in an overhanging position and there is no liability of a person accidentally falling from the back of the fender.

What is claimed is:—

1. The combination with a pivotally mounted fender provided with a rearwardly extending arm, of a rock shaft mounted above the said arm and provided with a cam arranged to engage the rearwardly extending approximately horizontal arm and means for partially rotating the rock shaft to swing the cam into and out of engagement with the said arm.

2. The combination with a pivotally mounted fender provided with a rearwardly extending arm, of a rock shaft provided with a cam arranged to swing into and out of engagement with the rearwardly extending arm, manually operable means designed to be located adjacent to the controller of a car and connected with the rock shaft and tripping mechanism located in advance of the fender and connected with the rock shaft whereby the same will be partially rotated to release the fender when the tripping mechanism comes in contact with an object.

3. The combination with a pivotally mounted fender provided with a rearwardly extending arm, of a rock shaft provided with a cam arranged to engage the rearwardly extending arm, a manually operable lever designed to be mounted on a car within easy reach of a motorman and means for connecting the lever with the rock shaft.

4. The combination with a pivotally mounted fender provided with a rearwardly extending arm, of a rock shaft provided with a cam arranged to engage the rearwardly extending arm, a front rock shaft connected with and adapted to actuate the said rock shaft and a transverse series of tripping arms depending from the front rock shaft.

5. The combination with a pivotally mounted fender, of a rear rock shaft provided with means for engaging and supporting the fender in an elevated position, a front rock shaft connected with the rear rock shaft, a plurality of tripping arms depending from the front rock shaft and provided at their lower ends with bumpers and a flexible connection between the arms.

6. The combination with a pivotally mounted fender, of operating mechanism including a rock shaft located in advance of the fender, means controlled by the rock shaft for supporting the fender in an elevated position, an electric switch arranged between the rock shaft and the fender having a lever or blade, and means for connecting the lever or blade with the rock shaft for cutting off the current controlled by the switch simultaneously with the operation of the fender.

7. The combination with a pivotally mounted fender, of means for supporting the same in an elevated position including a rock shaft arranged in advance of the fender, a brake having a valve located in rear of the fender and connections between the valve and the rock shaft whereby the brake will be applied when the fender is operated.

8. The combination with a pivotally mounted fender, of a rear rock shaft provided with means for holding the fender in an elevated position, a front rock shaft connected with the rear rock shaft and provided with a plurality of trip arms located in advance of the fender, a switch having a blade or lever connected with the front rock shaft and brake mechanism provided with a valve connected with the rock shaft.

In testimony whereof I affix my signature in presence of two witnesses.

WILLIAM STILLWELL.

Witnesses:
CLARENCE H. THORNTON,
F. V. HEISEL.